United States Patent [19]

Cuevas

[11] Patent Number: 4,913,461

[45] Date of Patent: Apr. 3, 1990

[54] AIRBAG MODULE AND METHOD OF MAKING SAME

[75] Inventor: Jess Cuevas, Scottsale, Ariz.

[73] Assignee: Talley Automotive Products, Inc., Mesa, Ariz.

[21] Appl. No.: 290,544

[22] Filed: Dec. 27, 1988

[51] Int. Cl.$^4$ ............................................. B60R 21/16
[52] U.S. Cl. .................................... 280/731; 280/734
[58] Field of Search ............... 280/730, 731, 732, 728, 280/734, 735, 743

[56] References Cited

U.S. PATENT DOCUMENTS

| | | | |
|---|---|---|---|
| Re. 27,860 | 1/1974 | Day | 417/184 |
| Re. 29,228 | 5/1977 | Hass | 280/738 |
| 2,976,907 | 3/1961 | Harvey et al. | 72/56 |
| 3,438,115 | 4/1969 | Humphress et al. | 29/421 |
| 3,552,770 | 1/1971 | Berryman | 280/740 |
| 3,590,464 | 7/1971 | Wildi et al. | 29/421 |
| 3,675,942 | 7/1972 | Huber | 280/738 |
| 3,715,131 | 2/1973 | Hurley et al. | 280/736 |
| 3,727,942 | 4/1973 | Arntson et al. | 280/731 |
| 3,762,741 | 10/1973 | Fleck et al. | 280/729 |
| 3,767,225 | 10/1973 | Mazelsky | 280/729 |
| 3,773,350 | 11/1973 | Shibamoto | 280/729 |
| 3,773,351 | 11/1973 | Catanzarite | 280/738 |
| 3,776,570 | 12/1973 | Weman | 280/738 |
| 3,778,083 | 12/1973 | Hamasaki | 280/739 |
| 3,784,225 | 1/1974 | Fleck et al. | 280/729 |
| 3,788,663 | 1/1974 | Weman | 280/729 |
| 3,791,666 | 2/1974 | Shibamoto | 280/729 |
| 3,791,669 | 2/1974 | Hamilton | 280/738 |
| 3,793,701 | 2/1974 | Chartet | 29/421 |
| 3,819,205 | 6/1974 | Dunford et al. | 280/731 |
| 3,827,715 | 8/1974 | Lynch | 280/735 X |
| 3,843,152 | 10/1974 | Nonaka | 280/731 |
| 3,848,325 | 11/1974 | Bimba | 29/511 |
| 3,880,447 | 4/1975 | Thorn et al. | 280/740 |
| 3,895,823 | 7/1975 | Stephenson | 280/731 |
| 3,907,330 | 9/1975 | Kondo et al. | 280/731 |
| 3,909,037 | 9/1975 | Stewart | 280/738 |
| 3,910,595 | 10/1975 | Katter et al. | 280/732 |
| 3,917,023 | 11/1975 | DeRosa | 280/735 |
| 3,934,984 | 1/1976 | Marlow et al. | 23/281 |
| 4,131,300 | 12/1978 | Radke et al. | 280/737 |
| 4,178,017 | 12/1979 | Ishi et al. | 280/740 |
| 4,278,638 | 7/1981 | Nilsson et al. | 422/166 |
| 4,722,551 | 2/1988 | Adams | 280/736 |

*Primary Examiner*—Charles A. Marmor
*Assistant Examiner*—Brian L. Johnson
*Attorney, Agent, or Firm*—Pennie & Edmonds

[57] ABSTRACT

An airbag module comprising a pyrotechnic inflator device; an inflatable air cushion operatively associated therewith; a retainer for lockingly engaging the air cushion to the inflator and a mounting plate configured and adapted for securing the inflator, the air cushion and the retainer in operative association. A variety of inflator embodiments may be incorporated into the module assembly but each requires, along at least a portion of the housing thereof, a rounded arcuate surface configured for engagement with the retainer upon the formation of a structural seal between the mounting plate and the retainer. This structural seal is created by magnaforming a portion of the mounting plate into a corresponding open groove upon the retainer. The module is thus fabricated by positioning the inflator upon the mounting plate; lockingly engaging the air cushion and the retainer; lowering the retainer/cushion assembly over the inflator and magnaforming the wall of the mounting plate into the groove on the surface of the retainer.

21 Claims, 2 Drawing Sheets

AIRBAG MODULE AND METHOD OF MAKING SAME

TECHNICAL FIELD

The invention relates to passive safety devices for installation within a motor vehicle and more particularly to a modularized assembly for mounting an air bag together with an inflation device therefor upon the steering wheel assembly of such a vehicle.

BACKGROUND OF THE INVENTION

Pyrotechnic inflator devices utilizing solid combustible gas generant compositions are well known for use in motor vehicles such as automobiles to protect the operator thereof from injury occurring as a result of a collision between the subject vehicle and another object. An important consideration involved with installing such passive restraint systems, however, is how to arrange and position the device upon the steering wheel assembly thereof.

For reasons of styling and consumer acceptance, as well as not interfering with the driver's movement or his vision of the instrument panel, and so as not to degrade the vehicle's steering dynamics, it is desirable to arrange a crash restraint apparatus as conveniently as possible, and yet have it positioned so that it effectively accomplishes its intended protective function. In addition, since an inflator device for such a crash restraint system must be capable of discharging a relatively large volume of gas in a very short period of time (i.e., within about 30-60 milliseconds), there are safety considerations which must be taken into account, not only in the deployment of the inflator within the vehicle, but also with regard to handling, installing, replacing and repairing such devices.

Moreover, in the particular case of a driver's side, i.e., steering wheel, installation within an automobile or a truck, for example, the utilization of an inflator apparatus having a relatively low mass is important for several reasons. First, the steering wheel assembly is installed in a cantilevered position at the end of the steering column, and thus excessive weight placed upon this assembly can cause column whip, attributable to vertical accelerations due to road shocks (e.g., bumps or chuckholes) which may, in turn, lead to degraded if not total loss of driver control. Secondly, if for reasons such as styling or driver vision line clearance, the inflator is required to be located asymmetrically with respect to the steering column centerline, any excessive weight attributable to this device will create resistive wheel turning torque, thus degrading the rotational dynamics of the steering assembly and providing potential for loss of driver control or other undesirable vehicle handling "feel" under certain driving conditions.

Driver's side airbag inflator assemblies are thus conventionally centrally located within the circumferential periphery of the vehicle's steering wheel. Typically, the terminal portion of the steering shaft adjacent the steering wheel is covered by a steel hub. This hub is connected by several spokes to the rim of the wheel, utilizing fasteners such as bolts or screws in order to provide structural rigidity to the assembly. In some cases a metal frame mounting plate or "spider" (so-called due to its arachnid appearance) is installed above the hub with its legs fastened to the wheel above the spokes. The inflator is then mounted upon this spider, which has a central aperture configured to accept at least a portion of the inflator housing. Several variations of this arrangement are illustrated in, for example, U.S. Pat. No. 3,827,715 to Lynch and U.S. Pat. No. 3,895,823 to Stephenson.

In an alternate assembly technique practiced in the prior art, an upper "diffuser" portion of the inflator is inserted through an aperture defined in a supporting frame member from the rear thereof. The inflator unit and the frame member are then oriented in a manner such that several apertures defined in flanged "ear" portions which extend from the generator housing, are aligned with corresponding mounting apertures in the mounting plate. This arrangement thus permits these components to be fastened together by the use of a plurality of securing means, such as bolts, rivets or screws which are passed through the generator mounting "ears" and thereafter through the mounting plate.

Moreover, to retain an air bag in operative association with the inflator device, the bag is normally provided around its mouth portion with a number of reinforced apertures. This portion of the bag is then wrapped around a separate bag retaining ring, having a series of apertures corresponding to those through the bag mouth. The bag and ring assembly is then fastened using a second group of fasteners, to the front face of the mounting plate. Alternately, the bag may simply be sandwiched between a retaining member and the front face of the mounting plate with the fasteners passing through: (1) the mounting plate, (2) the air bag and (3) the retaining member. In either event, a variety of time-consuming, labor intensive fastening operations must be undertaken in order to secure: (1) the inflator to the mounting plate and (2) the air bag to the mounting plate. Securing means, such as, for example, lock nuts, are utilized to prevent loosening of the fasteners which connect the various components in operative alignment.

In addition, to protect the relatively fragile electrical leads which extend out of the bottom, i.e., closure, member of the inflator housing (from the electrically activated ignition squib positioned therein), an additional component known as a "wire shield", is typically screwed or bolted to the rear face of the mounting plate, rearwardly of the inflator unit, during the assembly procedure. The wires are routed through an aperture in the diffuser provided therein for this purpose and thereafter through an open space in the wire shield to a remote collision sensor located elsewhere upon the vehicle. This "wire shield" member, requiring a separate assembly step to install, is required to prevent the wires from breaking off from the squib if the inflator device is accidentally dropped or bumped during its assembly with the mounting plate or during installation within the steering mechanism of the vehicle.

The air bag is normally folded for storage and positioned on top of the diffuser portion of the inflator, which extends above the mounting plate through the mounting aperture, where it remains until the passenger restraint apparatus is actuated. A cover member is then installed above the bag in order to hide the assembly from view and to improve the aesthetic appearance of the vehicle's interior.

To facilitate the installation and removal of airbag systems of the type described above, these assemblies have previously been produced in modular form, as described for example, in U.S. Pat. No. 3,819,205 to Dunford et al. In a preferred embodiment of the Dunford et al. device, a support plate, generally conforming to the shape of the opening of a dished hub, includes extensions which overlie the spokes. Offset flanges on the support member seat on embossments of the hub and are secured thereto by fasteners inserted from the lower side of the hub.

The support plate mounts the gas generator, the diffuser, the air bag, a container for the air bag, and an outer decorative closure which hides the aforementioned components from view. In addition, both the container and the closure are provided with H-shaped weakened, i.e., scored, portions which may be readily ruptured to provide an opening so that the air bag can deploy therethrough when the gas generator is actuated. The assembly of these modularized components still, however, requires the insertion of a plurality of fastener members in order to maintain each part in operative alignment.

SUMMARY OF THE INVENTION

The present invention concerns an improved modular design for a motor vehicle passive restraint, i.e., air bag, assembly, which may be utilized in a variety of forms of motor transport, e.g., automobile, van, truck, etc.

It is thus an object of the present invention to provide a modularized air bag passive restraint assembly which may be constructed without the use of fasteners such as bolts or screws which are required in the prior art to maintain the various components of such a device inoperative association.

It is a further object of the invention to make available an air bag module assembly having a built-in wire shield formed as a portion of the mounting plate therefor, thus eliminating a time-consuming assembly step.

It is a still further object of the invention to provide a modular air bag system which may be assembled utilizing a minimum number of parts at a reduced number of work stations while in fact enhancing the strength of the bond among the various components.

It is another object of the present invention to design an air bag module assembly configured for the inclusion of a variety of inflator unit designs in which the only critical structural requirement for permitting the integration of a particular inflator into the module is the presence of a rounded shoulder portion upon the outer periphery of the inflator housing, typically in the zone where the closure and diffuser members are joined together.

The presently claimed module assembly is thus comprised of four principal components: an inflator device, a retainer ring, an inflatable air bag and a mounting plate. Inflator devices for use in applicant's proposed module assembly are preferably constructed of a relatively light-weight, corrosion resistant, high tensile strength material, such as aluminum or titanium, or alternately, certain light-weight stainless steels. Such inflators typically comprise an upper diffuser member and a lower closure member for sealing the diffuser member, which together form the generator housing. Positioned within the housing is a solid, pyrotechnic gas generating composition and a means for igniting the propellant, such as an electrically actuated squib, located adjacent thereto. Interposed between the propellant and the inner surface of the diffuser is a filtering assembly for cooling the gas and removing molten particulates therefrom prior to its discharge through a plurality of exit ports in the diffuser, and into the attached air bag.

Applicant is aware of only two inflator embodiments having the requisite external rounded shoulder feature necessary to permit their inclusion into the module assembly of the present invention. These devices are described in applicant's co-pending patent applications entitled LIGHTWEIGHT NON-WELDED INFLATOR UNIT FOR AUTOMOBILE AIRBAGS filed under Ser. No. 233,191 on Aug. 17, 1988 and LIGHTWEIGHT NON-WELDED GAS GENERATOR WITH ROLLED SPUN LIP filed under Ser. No. 246,065 on Sept. 16, 1988. The disclosure of each of these applications is thus expressly incorporated herein by reference.

Moreover, the air bag utilized with the present invention is further designed to have a locking bead within its mouth portion, which bead is comprised of an elastomeric O-ring capable of a limited degree of expansion and contraction, wrapped by the bag material and subsequently sewn into place. The locking bead is thus configured and adapted to fit into a first grooved portion along the upper outer surface of the retainer ring, which is positioned circumjacent to the inflator unit upon the mounting plate in the module assembly. To effect this engagement, the locking bead is simply stretched over the flanged upper lip of the retainer and the mouth of the bag is then permitted to contract back into the grooved portion thereof.

The flanged upper lip of the retainer ring serves to direct the hot gasses and particulates which exit the diffuser portion of the generator housing, through a plurality of diffuser ports along the periphery thereof, toward the central portion of the bag cavity and away from the stitched portion of the air bag to prevent damage thereto and to avoid a subsequent bag failure.

The mounting plate portion of applicant's module is initially formed as an open pan, which is subsequently sealed by a cover portion adapted to fit thereover, once the inflator air bag and the retaining ring have been locked therein. The mounting plate is constructed with several descending levels, or steps, which become relatively smaller in size as one proceeds from the open "front" portion of the plate (open, that is, prior to the installation of the cover member) to the closed "rear" portion thereof. As will be explained in detail below, each of these stepped portions serve a separate function.

Applicant's air bag module is thus quickly and easily assembled in the following sequence: first, the inflator is centered upon a second stepped portion of the mounting plate. Next, the locking bead within the bag mouth is stretched over the flanged upper lip of the retainer ring and thereafter permitted to retract back into the first, i.e., upper, groove thereon. The retainer and bag assembly is then lowered over the diffuser portion of the inflator until the bottom portion of the retainer ring also rests upon the second step, such that the retainer is circumjacent to the inflator. The bag is then folded for storage within the first stepped portion of the mounting plate and thereafter rests atop the diffuser portion of the inflator housing.

Subsequently, the second stepped portion of the mounting plate is formed into a second grooved portion of the retainer ring defined by the lower outer surface thereof. This technique permits both the bag and the inflator to be simultaneously locked into position within the mounting plate, within a matter of seconds, with no need for time-consuming and labor-intensive intermediate fastening steps.

As can be seen from the present disclosure, therefore, applicant's presently claimed module has a number of advantages over air bag assemblies existing in the prior art. These include:

1. The opening of the air bag is simplified. The bag remains locked in place at all times as a result of the bead configuration;

2. The bag to inflator joint is stronger due to the full 360° contact therebetween;

3. Bag to retainer orientation is unnecessary, i.e., there are no holes pierced in the bag for fastener retention;

4. There is no orientation required between the inflator and the mounting plate since there are no fasteners required for inflator retention;

5. There is no separate wire shield device required as in existing designs. Wire protection is "built-in"; and 6. Applicant's entire module may be assembled in approximately 10 seconds.

DETAILED DESCRIPTION OF THE PREFERRED EMBODIMENT

Figure 1:
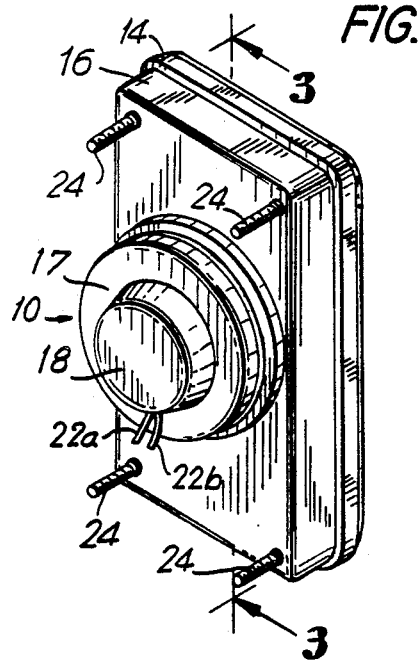
FIG. 1 is a perspective view of applicant's airbag module.

Referring initially to FIG. 1, there is illustrated the rearward face of applicant's module assembly 10. By "rear", "rearward", or "lower", therefore applicant means that portion of the assembly facing away from the driver. By extension, therefore, applicant will refer to the "front" or "upper" face of the assembly as that portion facing the driver of the vehicle. Thus, module 10, as illustrated in FIG. 1, externally comprises mounting plate 12 and cover portion 14. Cover 14 is used to seal the open end of plate 12 and to hide the contents thereof from view.

The recent emphasis on weight reduction for the purpose of fuel conservation in motorized vehicles, has created a need and a demand for a lighter weight passive restraint system. This is of particular importance in a crash protection system for the driver wherein the inflator is mounted on the vehicle's steering wheel. Plate 12 is thus preferably fabricated from a metal stamping, since this process is both quick and inexpensive. In the preferred embodiment, plate 12 is formed of aluminum in order to minimize the weight of module 10. The availability of a lighter weight inflator for installation at this location further enables a reduction to be made in the weight of the vehicle's steering wheel and the steering column on which the inflator is mounted, leading to a concurrent improvement in the "steerability" of the automobile.

Cover 14, is formed of a soft, flexible material, e.g., a urethane (such as polyurethane) or an engineering plastic, which is preferably colored and/or decorated (at least on its front face,) to enhance the aesthetic appearance of the steering wheel assembly. Cover 14 is preferably maintained in position upon mounting plate 12 either by engaging the upper peripheral edge of plate 12 or by equipping plate 12 along its upper, open end with a double wall thickness, that is, an inner and an outer wall with a space in-between, and forcing a compressible peripheral edge portion of cover 14 into the space between the walls, wherein it is held by compressing the walls toward each other or by crimping.

In the preferred embodiment, cover 14 is scored, preferably in an H-shape along its front face, to facilitate deployment of the air bag once the inflator is actuated. Thus, in the subject embodiment, cover 14 bursts at the score line as the bag is inflated, forming upper and lower flap portions which are pushed out of the way to permit expansion of the air bag as the combustion of the gas generant proceeds within the inflator.

Figure 3:
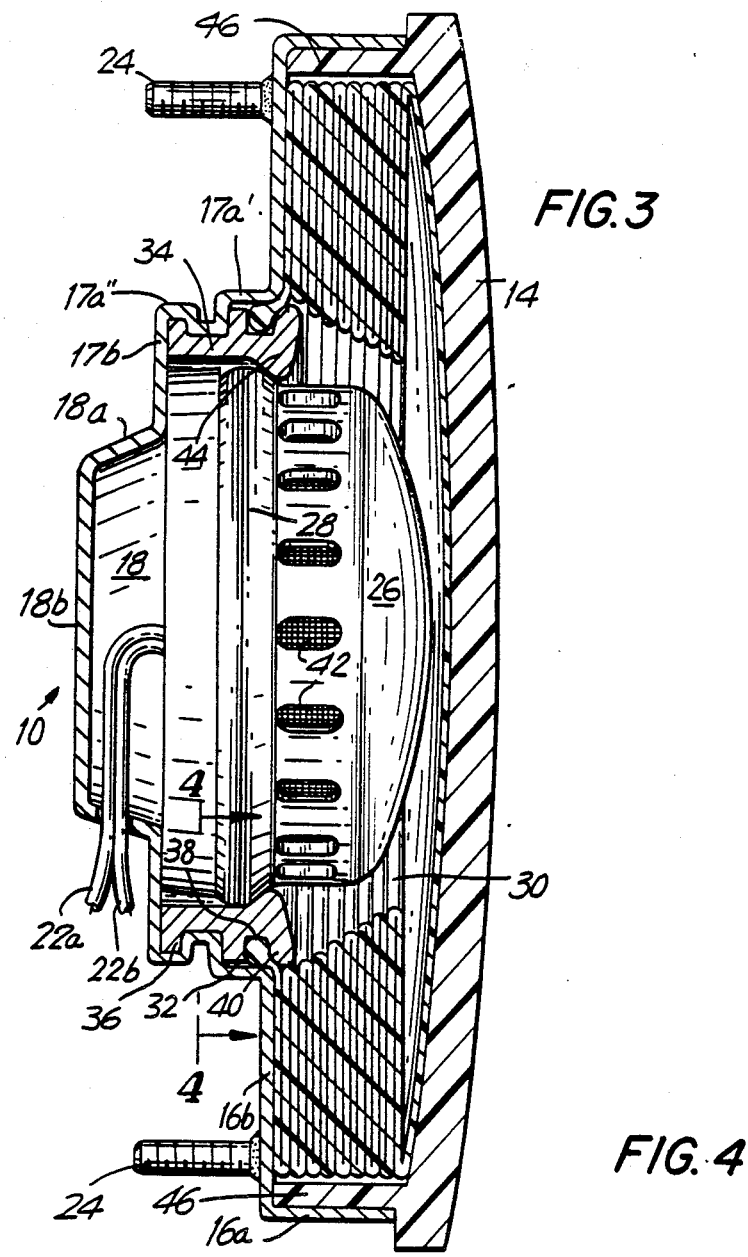
FIG. 3 is a view, partially in section, of the internal arrangement of components within the module of FIG. 1 taken along line 3—3 of FIG. 1.

Mounting plate 12 is configured with a series of stepped portions or levels 16, 17, 18 which are of relatively diminishing size from the front of the plate to the rear thereof. Steps 16, 17, 18 each perform a separate function, i.e., they are configured and adapted to permit insertion within plate 12 of a pyrotechnic air bag inflator device and to facilitate a subsequent locking engagement therewith. Plate 12 thus comprises a first stepped region 16, defined by outer wall 16a and base portion 16b; second stepped region 17, defined by outer circumferential wall 17a and base 17b said base 17b configured to support a flat lower surface of a pyrotechnic inflator device (as illustrated in FIG. 3) and a third stepped region 18, defined by outer circumferential wall 18a and base 18b.

Region 18 serves as an integral wire shield for protecting electrical leads 22a,b of module 10 from damage due to mishandling of the inflator during assembly. Moreover, although stepped regions 17, 18 are shown as being circular in shape, they may be configured in other geometric shapes so long as it is understood that second stepped region 17 must be shaped to permit insertion therein of an inflator unit of the type contemplated for use with module 10.

Wire shield 18 is positioned and configured at the base of module 10 to prevent, as noted above, inadvertent damage to electrical leads 22a,b extending from an igniter component (not shown), such as an electrically actuated squib, which is operatively positioned within the inflator to initiate combustion of the propellant charge therein upon a collision signal produced by a remote sensing device. Shield 18 further defines at least one aperture 20 which is configured to permi the passage of leads 22a,b out of module 10.

Plate 12 further comprises, on the rear or lower face thereof, a plurality of stud members 24, preferably four (4) in number extending perpendicularly to base portion 16b for a distance of about one inch. Studs 24 are preferably press fit into each of the four corners of plate 12 and are threaded to permit attachment between module 10 and an underlying frame portion of the vehicle's steering assembly, which attachment procedure will be described below in detail.

Figure 2:
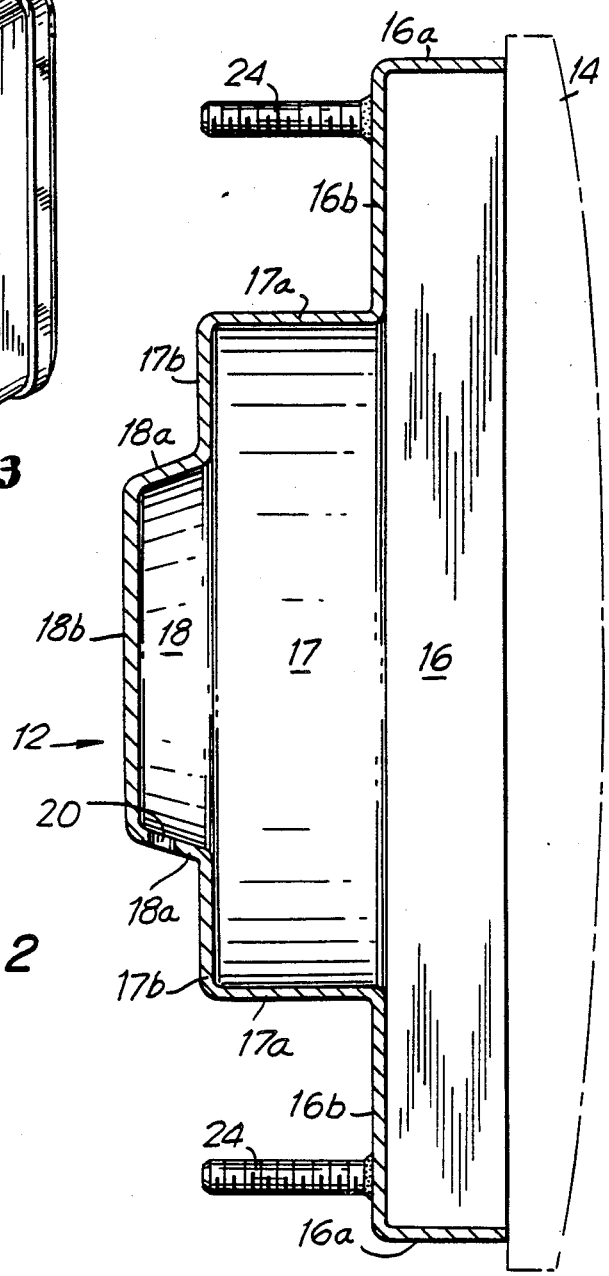
FIG. 2 is a sectional view taken through the mounting plate portion of the module of FIG. 1.

FIG. 2 provides a sectional view of mounting plate 12, illustrating the stepped configuration thereof as it appears prior to the forming of outer wall 17a around the inflator unit (discussed below). Mounting plate 12 thus initially presents the appearance of an open pan configured such that outer peripheral wall 17a of second stepped portion 17 lies circumjacent the inflator housing (as shown in FIG. 3) while base portion 17b is configured to support a lower or "closure" member of the inflator comprising the bottom portion of said housing. In addition, as may be noted from the drawing figure, wall 17a is initially configured in a substantially straight vertical line prior to the module forming step. Further, as discussed above, wall 18a, defining the circumferential periphery of stepped region 18, has at least one aperture 20 therethrough, which is configured for the passage of electrical leads 22a,b from the igniter, i.e., squib.

Turning now to FIG. 3 there is illustrated a sectional view through applicant's module 10 subsequent to the complete assembly thereof, involving the wall-forming step discussed in regard to FIG. 2. One important factor must be taken into account, however, concerning the configuration of inflator 26 which is included as a component of module 10. Whereas the internal arrangement of parts within inflator 26 is not a critical feature of the present invention, module 10 does require, in order to ensure an immovable locking engagement between inflator 26 and mounting plate 12, that inflator 26 have a rounded shoulder on at least a portion of its exterior surface as shown, for example, at 28. In the preferred embodiment, shoulder 28 extends completely around the outer periphery of inflator 26 at the juncture of the diffuser and the closure member, which together form the inflator housing. In alternate embodiments, however, a housing for inflator 26 may be formed in a different shape, e.g., a square, rectangle, etc. and/or shoulder 28 may extend along only a portion of the peripheral edge of inflator 26.

Moreover, as noted in the Summary portion of the present application, applicant is aware of only two inflation devices having the requisite external configuration, i.e., shoulder 28 (described below in detail), and the disclosure of applicant's copending patent applications directed to these embodiments has been incorporated herein by reference. Both of these novel inflator types are constructed according to new techniques which do not require the use of welds to maintain the structural integrity of these units. The present invention should not, however, be limited only to use with these inflators, or to non-welded inflators in general, although these are the preferred type.

In assembling module 10, air bag 30 is designed with locking bead 32, comprising an elastomeric O-ring. The O-ring is wrapped by the bag material and thereafter sewn in place within the mouth of the bag.

Also required is retainer ring 34 which is formed of a strong, lightweight metal forging, preferably constructed of aluminum due to its relatively low weight. Retainer ring 34 is configured and adapted to fit over and thereafter around inflator 26. Ring 34 is comprised of a first (upper, grooved channeled portion 38, a second (lower) grooved channelled portion 36 and an upper deflector flange 40 for preventing the impingement of hot gasses and/or molten particulates produced by the firing of inflator 26 directly upon the sewn portion of bag 30.

Flange 40 thus preserves the integrity of bag 30 during the inflation step wherein the aforesaid hot gasses and/or molten particulates, produced as result of the combustion of a solid gas generant within inflator 26, would otherwise exit diffuser ports 42 and impinge directly upon the inner surface of the bag. In the present arrangement, the particulate-containing gasses initially encounter angled flange 40 upon exiting through diffuser ports 42 from inflator 26, and are thereafter directed upwardly and away from the sewn portion of bag 30 toward the center of the bag.

Groove 38, located along the upper outer surface of retainer ring 34, is thus configured to accept locking bead 32. Therefore, once inflator 26 is centered on second stepped portion 17 of mounting plate 12, bead 32 in bag 30 is stretched over deflector flange 40 on ring 34 and the retainer ring and bag assembly is then lowered over inflator 26 such that the lower surface of ring 34 rests on surface 17b, thus positioning ring 34 circumjacent inflator 26.

Ring 34 is further configured, inwardly from upper groove 38, to engage rounded shoulder portion 28 of inflator 26 so as to lock inflator 26 within mounting plate 12 when lateral wall 17a thereof is formed into lower groove 36. This engagement is facilitated due to the presence of angled wall portion 44 located along an inner portion the upper surface of annular ring 34, adjacent groove 38. Angled wall 44 is thus configured to overlie and abut against shoulder portion 28 of inflator 26 as ring 34 is squeezed inwardly by the forming process.

Thus, by forming wall 17a into groove 36, a two-fold purpose is served: (1) the beaded portion 32 of bag 30 is locked into position within groove 38 on retainer ring 34, and (2) ring 34 and inflator 26 are also locked into position within mounting plate 12 due to the constriction created by forming wall 17a of plate 12 into groove 36. The cooperating effect between rounded shoulder portion 28 on inflator 26 and angled wall portion 44 on the inner surface of ring 34 therefore guarantees that retainer ring 32 will retain inflator 26 within module mounting plate 12 when applicant's passive restraint device, i.e., comprising module 10, is actuated. Thus, each of the components of module 10 are locked into place simultaneously by a single forming operation which may be performed in a matter of seconds without the need for locating and aligning numerous fasteners such as was previously required by the prior art.

With regard to the technique referred to above, wherein wall 17a is "formed" into lower groove 36 in retainer ring 34, applicant preferably utilizes a procedure known as "magnaforming" to effect the requisite connection between the module components. This technique is described, for example, in U.S. Pat. No. 2,976,907 to Harvey et al. (the "U.S. Pat. No. 3,907"), the disclosure of which is incorporated herein by reference.

Applicant has further determined that, with the use of the subject magnaforming technique, the temper of the metal of which the components of module 10 are formed should be as high as possible without being such that the metal cracks during the magnaforming process due to excessive brittleness. This ensures that module 10 may be constructed of lightweight materials, such as aluminum for example, while still maintaining a sufficient degree of structural strength to withstand the forces generated during actuation of inflator 26.

By the use of a magnaforming process such as that described in the U.S. Pat. No. '907, a variable magnetic field is first created outwardly adjacent the work piece, e.g., the second stepped portion 17 of mounting plate 12. Subsequently one or more force impulses set up by this force field are focused upon that portion of wall 17a on plate 12 overlying lower groove 36 defined by retainer ring 34. The effect of these force impulses is to almost instantaneously permit the subject portion of wall 17a to flow into groove 36 and thus to lock inflator 26, air bag 30 and retainer ring 34 together into a single unit in a matter of seconds. There is thus no need to physically contact wall 17a of plate 12 with any mechanical device in order to create a strong structural seal between the components of module assembly 10.

Module assembly 10 additionally comprises, as noted above, a plurality of threaded stud members 24, preferably four (4) in number, which may be press fit into each corner portion on the rear face of base portion 16b. Studs 24 are approximately one inch in length and are inserted, during installation of module 10 on the vehicle steering assembly, through corresponding apertures defined in an underlying metal frame or "spider" fastened directly to the steering wheel of the vehicle (not shown) below module 10. The subject spider is further configured with a central aperture to permit clearance for the third stepped portion 18 of mounting plate 12. Module assembly 10 is thereafter maintained in contact relation with the underlying spider with the use of fastener means such as a weld or locking nuts, which prevent withdrawal of studs 24 from their corresponding aperture in the spider prior to or during operation of inflator 26.

Thus, after magnaforming the component parts of module 10 so as to lockingly engage bag 30 and inflator 26 within mounting plate 12 by means of retainer ring 34, air bag 30 is neatly folded and placed atop the diffuser portion of inflator 26. Then the completed module assembly is bolted in a single operation to a frame, i.e., the "spider", connected directly to the vehicle's steering assembly. Finally, to complete the assembly, cover member 14, which is preferably pre-scored to facilitate the passage therethrough of air bag 30 upon its deployment during a collision, is snapped into place over the air bag with the aid of flexible members 46 extending perpendicularly therefrom to hide the various components of module 10 from sight and thus to enhance the aesthetic appearance of the vehicle's interior.

Figure 4:
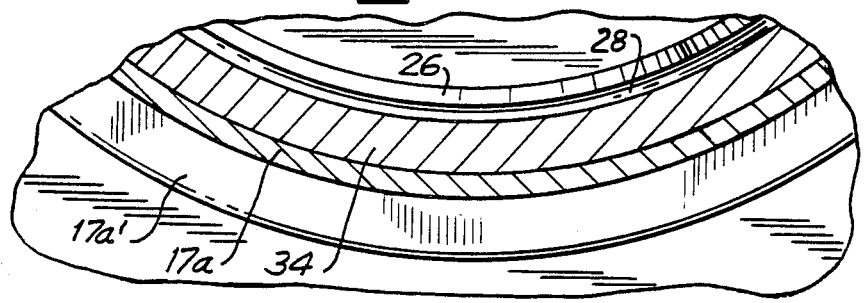
FIG. 4 is a sectional view taken along line 4—4 of FIG. 3.

FIG. 4 provides a sectional view through lower groove 36 in retainer ring 34. As may be seen from the illustration, the magnaforming technique utilized by applicant produces a continuous, even flow of metal wall 17a into groove 36. Thus 17a is conformed to the shape of the groove. This process deforms the substantially vertical wall 17a and leads to the formation of upper 17a' and lower 17a'' shoulder portions, separated by groove 36 having wall 17a formed therein, on second stepped portion 17 of module 10. As noted above, this procedure effectively locks plate 12 and ring 34 together which, in turn, maintains inflator 26 in position within module 10 due to the pressure of angled wall portion 44 against rounded shoulder portion 28 of the inflator.

While it is apparent that the invention herein disclosed is well calculated to fulfill the objectives stated above, it will be appreciated that numerous modifications and embodiments may be devised by those skilled in the art. It is intended that the appended claims cover all such modifications and embodiments as fall within the true spirit and scope of the present invention.

I claim:

1. A motor vehicle airbag module which comprises:
   (a) means for mounting a pyrotechnic inflator device within a passenger compartment of said motor vehicle, said inflator device being capable of producing a sufficient amount of a gaseous combustion product within a sufficient time to substantially deploy inflatable air cushion means operatively associated therewith within an interval between a primary collision of said vehicle with an object external thereto and a secondary collision between an operator of said vehicle and an interior portion thereof, said mounting means comprising an open pan having several stepped levels extending rearwardly thereon, each said level positioned directly over a next rearward one of said levels and having substantially the same depth at any point thereon, said levels correspondingly decreasing in relative volume from one located most forwardly to one located most rearwardly upon said mounting means;
   (b) a pyrotechnic inflator device positioned within said mounting means, said inflator device comprising a housing formed of a diffuser member having a first open end and a second closed end and a closure plate member sealing said open end thereof, said housing further comprising an arcuate surface extending along at least a portion of an outer periphery thereof, said arcuate surface configured and adapted to permit a locking engagement between said mounting means and said inflator device;
   (c) means for retaining inflatable cushion means in contact relation with said inflator device, said retaining means installed within said mounting means in surrounding relation to said diffuser member and configured to correspond to a portion of said arcuate surface thereof; and
   (d) inflatable air cushion means for preventing injury to an occupant of said vehicle caused due to contact with said interior of said vehicle upon the occurrence of said primary collision, said inflatable means comprising means located within a mouth portion thereof configured to facilitate locking engagement between said air cushion means and said retaining means upon assembly of said module, wherein at least a portion of said mounting means is lockingly engaged within a corresponding open channel extending along at least a portion of an outer surface of said retaining means forming a structural seal therebetween such that said inflator device, said inflatable air cushion means and said retaining means are all maintained together in lockup engagement with one another within said mounting means without the use of any additional locking means.

2. The module of claim 1 wherein said mounting means is lockingly engaged within said open channel by a structural seal formed therebetween; said seal created by magnaforming a peripheral wall portion upon one of said stepped levels of said mounting means such that said wall portion is formed into said open channel means.

3. The module of claim 2 wherein said mounting means is a metal stamping which comprises, in series, a first, a second and a third stepped level extending rearwardly thereon, each said level completely overlying a next rearward one of said levels and comprising a base portion and an integral peripheral wall portion formed substantially perpendicular thereto, said peripheral wall portion of each said level extending entirely around an outer periphery of said corresponding level and being of a substantially unvarying width therealong such that each said level has a substantially constant depth at any point thereon.

4. The module of claim 3 wherein said mounting means further comprises means for covering said open portion thereof, said cover means configured and adapted to engage at least a portion of an upper peripheral surface of said mounting means.

5. The module of claim 4 wherein said pyrotechnic inflator device includes:
(a) a domed diffuser member, having a first open end and a second closed end;
(b) a closure plate member sealing the open end of said diffuser member and thereby forming an inflator housing;
(c) a sufficient amount of a combustible gas generant material located within an interior portion of said housing to produce, upon combustion thereof, a volume of a gaseous product sufficient to substantially inflate said air cushion means operatively associated therewith within about 30-60 milliseconds;
(d) means for initiating combustion of said gas generant material, said initiating means located within said inflator housing adjacent said gas generant; and
(e) means located within said housing for filtering said gaseous combustion product prior to its discharge from the inflator housing, said filtering means circumferentially surrounding said gas generant material adjacent an inner wall portion of said housing, and adapted for cooling said gas and removing substantially all particulate matter therefrom,
said closure plate member and said domed diffuser member being sealed together without welding either of said members to form an inflator housing capable of withstanding elevated pressures produced by combustion of said gas generant material.

6. The module of claim 5 wherein said open end of said diffuser member comprises a peripheral lip portion, said lip portion being sealed over an outer circumferential edge of said closure plate member by magnaforming said lip portion over said edge.

7. The module of claim 5 which further comprises a ring-shaped member configured and adapted for snap-locking engagement with a rolled lip portion of said diffuser member against a bottom surface of said closure member, said locking member further comprising a notched edge portion along an outer surface thereof, said notch configured to engage at least an outer terminal end of said rolled lip.

8. The module of claim 5 wherein said arcuate surface comprises a rounded shoulder portion upon said inflator housing, said shoulder extending along at least a portion of an outer surface thereof and having a diameter greater than a remaining portion of said housing, said shoulder configured and adapted to permit a locking engagement between said inflator device and said retaining means within said module.

9. The module of claim 8 wherein said means for initiating combustion of said gas generant material is an electrically actuated squib, said squib being operatively connected to a remote collision sensing device by at least one electrical lead passing outwardly from said module through an aperture defined by said third stepped level of said mounting means.

10. The module of claim 5 wherein said means for filtering said gaseous combustion product comprises a plurality of screen members, said screen members being of relatively decreasing mesh size from an inner portion of said filtering means adjacent said gas generant to an outer portion thereof adjacent said inner wall portion of said housing, said filtering means configured to form a tortuous exit path for said gas and adapted to cool and filter substantially all said particulate matter therefrom.

11. The module of claim 10 wherein said domed diffuser member further comprises a plurality of diffuser ports spaced substantially equidistantly around a peripheral portion thereof, said ports providing fluid communication between the interior of said housing and an inner space defined by said inflatable air cushion means operatively associated therewith to permit deployment of said air cushion means upon the combustion of said gas generant material.

12. An airbag module for installation within a motor vehicle, said module comprising:
(a) a mounting plate for securing a pyrotechnic inflator device within said module, said mounting plate comprising a metal stamping configured as an open pan having, in series, a first, a second and a third stepped level extending rearwardly thereon, each said stepped level completely overlying a next rearward one of said levels and comprising a base portion and an integral peripheral wall portion formed substantially perpendicular thereto, said peripheral wall portion of each said level extending entirely around an outer periphery of said corresponding level and being of a substantially unvarying width therealong such that each said level has a substantially constant depth at any point thereon, said levels correspondingly decreasing in relative volume from said first level to said third level, respectively upon said mounting plate;
(b) a cover member configured and adapted to engage at least an upper peripheral portion of said mounting plate so as to conceal an underlying pyrotechnic inflator device and air bag assembly from view and thereby to enhance the outward appearance of said module;
(c) a pyrotechnic inflator device positioned upon said second stepped level of said mounting plate, said inflator device capable of producing a sufficient amount of a gaseous combustion product within a sufficient time to substantially deploy an air bag operatively associated in contact relation with said inflator within a period ranging between about 30-60 milliseconds, said inflator device comprising
(i) a domed diffuser member having a first open end and a second closed end and a plurality of diffuser ports spaced substantially equidistantly along an outer periphery thereof to facilitate fluid communication between an inner portion of an inflator housing formed with said diffuser member and an interior space defined by said air bag;
(ii) a closure plate member sealing the open end of said diffuser member, thereby forming said inflator housing;
(iii) a sufficient amount of a combustible gas generant material located within said inflator housing to produce, upon combustion thereof, a volume of gaseous product sufficient to substantially inflate said air bag within about 30-60 milliseconds;
(iv) an electrically actuated squib for initiating combustion of said gas generant material, said squib positioned within said housing adjacent said gas generant and operatively connected to a remote collision sensing device located upon said motor vehicle by at least one electrical lead passing through an aperture defined by said third stepped level of said mounting means; and (v) a plurality of screen members located within said inflator housing for filtering said gaseous combustion product prior to discharge thereof through said diffuser ports, said screen members circumferentially surrounding said gas generant material and being of a relatively decreasing mesh size from an inner portion thereof adjacent said gas generant to an outer portion adjacent an inner wall portion of said housing, said screen members configured to form a tortuous exit path for said gas and adapted to cool and filter substantially all particulate matter therefrom, said closure plate member and said domed diffuser member being sealed together without welding either of said members such that said housing comprises a rounded shoulder portion extending along at least a portion of an outer surface thereof, said shoulder having a diameter relatively greater than a remaining portion of said housing such that said inflator is therefore configured and adapted for locking engagement with retaining means positioned in surrounding engagement therewith within said module;

(d) means located adjacent said inflator device on said second stepped portion of said mounting plate, said means configured to extend entirely around an outer periphery of said diffuser member to retain said inflator device within said module and adapted for locking engagement with a mouth portion of said air bag to retain said inflator device in operative association therewith; and (e) an inflatable air bag comprising a mouth portion adapted for locking engagement with said retaining means, said air bag positioned forwardly of said diffuser member and resting thereupon within said first stepped level of said mounting plate in a manner to permit deployment thereof upon the combustion of said gas generant material within said inflator housing, the peripheral outer wall of said second stepped portion being lockingly engaged within a corresponding open channel upon said retaining means by a structural seal therebetween, said seal formed by magnaforming said wall into said channel such that said inflator device, said air bag and said retaining means are all maintained together in operative within locking engagment with one another said mounting plate without the use of any additional locking a means.

13. The module of claim 12 wherein said retaining means is an annular metal forging having an upper and a lower, opposed surface, said retaining means comprising:

(i) a first grooved portion adjacent said upper surface thereof, said first groove configured and adapted for locking engagement with mouth portion of said air bag; and (ii) a second grooved portion adjacent said lower surface thereof, said second groove configured and adapted for forming a structural seal with said outer peripheral wall comprising said second stepped level of said mounting plate, said seal produced by magnaforming said outer peripheral wall of said second level such that said wall is formed into said second grooved portion.

14. The module of claim 13 wherein said retaining means is constructed of a light weight, high-tensile strength material and which further comprises flanged means formed integral with said upper surface for directing said gaseous combustion products away from an interior surface of said air bag and toward an inner space defined thereby.

15. The module of claim 14 wherein said retaining means further comprises an angled wall portion extending along at least a portion of an inner annular surface thereof, said angled wall portion adapted to overlie said rounded shoulder portion upon said inflator device and thereby to retain said inflator within said module upon the formation of said structural seal.

16. The module of claim 12 wherein said air bag further comprises a locking bead secured within a mouth portion thereof, said bead configured for locking engagement of said bag mouth within said first grooved portion of said retaining means.

17. The module of claim 16 wherein said locking bead comprises an elastomeric O-ring member sewn within said mouth portion of said air bag.

18. The module of claim 12 wherein said cover member is formed of a relatively flexible material selected from a urethane and an engineering plastic, said cover member comprising a substantially planar top portion having first and second opposed surfaces and at least one means for lockingly engaging said mounting plate, said locking means formed integral with and extending substantially perpendicularly from, said second surface of said top portion.

19. The module of claim 18 wherein said top portion of said cover member is scored along at least a portion of said first surface thereof, to facilitate deployment of said air bag upon actuation of said pyrotechnic inflator device.

20. A method for constructing a modular air bag assembly for installation within a motor vehicle, said method comprising:

(a) positioning a pyrotechnic inflator device upon said second stepped portion of the mounting plate of claim 12, said inflator device comprising, along at least a portion of an outer peripheral surface of a housing thereof, a rounded shoulder portion extending outwardly therefrom, said shoulder portion having a relatively greater diameter than a remaining portion of said housing;

(b) securing a flexible locking bead within an open mouth portion of an inflatable air bag;

(c) stretching said locking bead over an upper portion of a retaining member and into a first upper grooved portion defined thereby to form a retainer/bag assembly, said retaining member configured for installation adjacent said inflator device upon said mounting plate, in surrounding relation thereto;

21. An airbag module for installation upon a steering assembly of a motor vehicle, said module comprising:

(a) a mounting plate for securing a pyrotechnic inflator device within said module, said mounting plate formed of a metal stamping comprising an open pan having, in series, a first, a second and a third stepped level extending rearwardly thereon, each said stepped level completely overlying a next rearward one of said levels and comprising a base portion and an integral peripheral wall portion formed substantially perpendicular thereto, said peripheral wall portion of each said level extending entirely around an outer periphery of said corresponding level and being of a substantially unvarying width therealong such that each said level has a substantially constant depth at any point thereon, said levels correspondingly decreasing in relative volume from said first level to said third level, respectively;

(b) a cover member formed of a relatively flexible material selected from a urethane and an engineering plastic, said cover member comprising a substantially planar top portion having first and second opposed surfaces and at least one means for lockingly engaging said cover member upon said mounting plate, said locking means formed integral with and extending substantially perpendicularly from said second surface thereof, said cover member further having a score along at least a portion of said first upper surface of said top portion to facilitate deployment of said air bag upon actuation of a pyrotechnic inflator device associated therewith;

(c) a pyrotechnic inflator device positioned upon said second stepped level of said mounting plate, said inflator capable of producing a sufficient amount of a gaseous combustion product within a sufficient time to substantially deploy an air bag operatively associated in contact relation with said inflator within a period ranging between about 30-60 milliseconds, said inflator device comprising (i) a domed diffuser member having a first open and a second closed end and a plurality of diffuser ports spaced substantially equidistantly along an outer periphery thereof to facilitate fluid communication between an inner portion of an inflator housing formed with said diffuser member and an interior space defined by said air bag;

(ii) a closure plate member sealing the open end of said diffuser member, thereby forming said inflator housing;

(iii) a sufficient amount of a combustible gas generant material within said inflator housing to produce, upon combustion thereof, a volume of gaseous produce sufficient to substantially inflate said air bag within about 30-60 milliseconds;

(iv) an electrically actuated squib for initiating combustion of said gas generant material, said squib positioned within said housing adjacent said gas generant and operatively connected to a remote collision sensing device located upon said motor vehicle by at least one electrical lead passing. through an aperture defined by said third stepped level of said mounting means; and (v) a plurality of screen members located within said housing for filtering said gaseous combustion product prior to discharge thereof through said diffuser ports, said screen members circumferentially surrounding said gas generant material and being of a relatively decreasing mesh size from an inner portion thereof adjacent said gas generant to an outer portion adjacent an inner wall portion of said housing, said screen members configured to form a tortuous exit path for said gas and adapted to cool and filter substantially all particulate matter therefrom, said closure plate member and said domed diffuser member being sealed together without welding either of said members such that said housing comprises a rounded shoulder portion extending along an outer surface thereof, said shoulder portion having a diameter relatively greater than a remaining portion of said housing, such that said inflator is therefore configured and adapted for locking engagement with a retaining ring positioned in surrounding engagement therewith within said module, (d) an annular metal retaining ring positioned adjacent said inflator, device within said mounting plate and extending entirely around an upper diffuser portion of said inflator device, said retaining ring having an upper surface and a lower opposed surface and comprising (i) a first grooved portion adjacent said upper surface thereof, said first groove configured and adapted for locking engagement with a locking bead secured within a mouth portion of said air bag;

(ii) a second grooved portion adjacent said lower surface, said second groove configured and adapted for forming a structural seal with an outer peripheral wall defining said second stepped level of said mounting plate, said seal produced by magnaforming said outer peripheral wall of said second level such that said wall is formed into said second groove;

(iii) an angled deflector flange formed integral with said upper surface of said retaining ring, said flange configured and adapted to direct said gaseous combustion products away from an interior surface of said air bag and toward an inner volume defined thereby; and (iv) an angled wall portion extending along an inner annular surface of said retaining ring, said angled wall portion adapted to overlie said rounded shoulder portion upon said inflator device and, thereby to retain said inflator within said module upon the formation of said structural seal; and (e) an inflatable air bag having a locking bead comprising an elastomeric O-ring secured within a mouth portion thereof, said bead configured for locking engagement of said bag mouth within said first grooved portion of said retaining ring so as to retain said air bag in operative contact relation with said inflator device, the peripheral outer wall of said second stepped portion of said mounting plate being lockingly engaged within said corresponding second grooved portion upon said retaining ring by a structural seal created therebetween, said seal formed by magnaforming said wall into said grooved portion, said groove extending around an entire outer surface of said retaining ring such that said inflator device, said air bag and said retaining ring are all maintained together in lockup engagement with one another within said mounting plate without the use of any additional locking means.

* * * * *